United States Patent
Sholes, Jr. et al.

(10) Patent No.: US 8,250,848 B2
(45) Date of Patent: Aug. 28, 2012

(54) STEAM TURBINE POWER SYSTEM AND METHOD OF ASSEMBLING THE SAME

(75) Inventors: John Edward Sholes, Jr., Kings Mountain, NC (US); Raub Warfield Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 785 days.

(21) Appl. No.: 12/436,030

(22) Filed: May 5, 2009

(65) Prior Publication Data

US 2010/0281844 A1    Nov. 11, 2010

(51) Int. Cl.
*F02C 6/00* (2006.01)
*F02G 1/00* (2006.01)

(52) U.S. Cl. ........... 60/39.182; 60/690; 60/653; 60/670; 60/39.15

(58) Field of Classification Search ............ 60/653, 60/677, 679, 690, 692, 39.182, 39.15, 670
See application file for complete search history.

(56) References Cited

U.S. PATENT DOCUMENTS

| | | | | |
|---|---|---|---|---|
| 3,364,125 A * | 1/1968 | Switzer, Jr. | ............ | 202/160 |
| 3,990,243 A * | 11/1976 | Davoud | ............ | 60/653 |
| 4,043,130 A | 8/1977 | Brown et al. | | |
| 4,168,030 A * | 9/1979 | Timmerman | ............ | 237/13 |
| 4,399,656 A * | 8/1983 | Laing et al. | ............ | 60/659 |
| 4,407,131 A * | 10/1983 | Wilkinson | ............ | 60/648 |
| 4,628,212 A * | 12/1986 | Uehara et al. | ............ | 290/54 |
| 5,404,724 A | 4/1995 | Silvestri, Jr. | | |
| 5,490,377 A | 2/1996 | Janes | | |
| 5,581,997 A | 12/1996 | Janes | | |
| 6,220,013 B1 * | 4/2001 | Smith | ............ | 60/783 |
| 6,332,320 B2 * | 12/2001 | Kitz | ............ | 60/641.2 |
| 7,775,045 B2 * | 8/2010 | Kaplan et al. | ............ | 60/641.2 |
| 7,900,431 B2 * | 3/2011 | Willson et al. | ............ | 60/39.182 |
| 8,056,350 B2 * | 11/2011 | Minds et al. | ............ | 62/235.1 |
| 2002/0029572 A1 * | 3/2002 | Kangai et al. | ............ | 60/685 |
| 2010/0287935 A1 * | 11/2010 | Smith | ............ | 60/648 |
| 2011/0005225 A1 * | 1/2011 | Namba et al. | ............ | 60/645 |
| 2011/0088399 A1 * | 4/2011 | Briesch et al. | ............ | 60/728 |
| 2012/0085096 A1 * | 4/2012 | Penton et al. | ............ | 60/651 |

* cited by examiner

*Primary Examiner* — William H Rodriguez
(74) *Attorney, Agent, or Firm* — Armstrong Teasdale LLP

(57) ABSTRACT

A method of assembling a steam turbine power system with a coolant source is provided. The method includes providing a first steam turbine train including a first high pressure turbine assembly, a first low pressure turbine assembly coupled in flow communication with the first high pressure turbine assembly, and a first condenser coupled in flow communication with the first low pressure turbine assembly. The method also includes providing a second steam turbine train including a second high pressure turbine assembly, a second low pressure turbine assembly coupled in flow communication with the second high pressure turbine assembly, and a second condenser coupled in flow communication with the second low pressure turbine assembly. The method further includes coupling cooling tubes to the first condenser and the second condenser, the cooling tubes configured to deliver coolant from the coolant source through the first condenser, from the first condenser through the second condenser, and from the second condenser back to the coolant source.

20 Claims, 2 Drawing Sheets

STEAM TURBINE POWER SYSTEM AND METHOD OF ASSEMBLING THE SAME

BACKGROUND OF THE INVENTION

The field of this disclosure relates generally to steam turbines and, more particularly, to a steam turbine power system and a method of assembling the same.

Many known steam turbine power systems include at least one steam turbine train that utilizes a condenser to condense exhausted steam into liquid water for recirculation through the train. Specifically, at least some known steam turbine power systems utilize multiple, independent steam turbine trains, each train with its own condenser that is cooled in parallel with the condensers of the other trains.

However, when the condensers of multiple, independent steam turbine trains are cooled in parallel, the condenser pressure differential across the independent trains is minimal (i.e., the trains tend to have substantially the same efficiencies). As such, it would be useful to have a steam turbine power system in which the condenser pressure in at least one of the multiple, independent steam turbine trains is able to be decreased, thereby increasing the overall efficiency of the power system.

BRIEF DESCRIPTION OF THE INVENTION

In one aspect, a method of assembling a steam turbine power system with a coolant source is provided. The method includes providing a first steam turbine train including a first high pressure turbine assembly, a first low pressure turbine assembly coupled in flow communication with the first high pressure turbine assembly, and a first condenser coupled in flow communication with the first low pressure turbine assembly. The method also includes providing a second steam turbine train including a second high pressure turbine assembly, a second low pressure turbine assembly coupled in flow communication with the second high pressure turbine assembly, and a second condenser coupled in flow communication with the second low pressure turbine assembly. The method further includes coupling cooling tubes to the first condenser and the second condenser, the cooling tubes configured to deliver coolant from the coolant source through the first condenser, from the first condenser through the second condenser, and from the second condenser back to the coolant source.

In another aspect, a steam turbine power system for use with a coolant source is provided. The system includes a first steam turbine train including a first high pressure turbine assembly, a first low pressure turbine assembly coupled in flow communication with the first high pressure turbine assembly, and a first condenser coupled in flow communication with the first low pressure turbine assembly. The system also includes a second steam turbine train including a second high pressure turbine assembly, a second low pressure turbine assembly coupled in flow communication with the second high pressure turbine assembly, and a second condenser coupled in flow communication with the second low pressure turbine assembly. The system further includes cooling tubes coupled to the first condenser and the second condenser, the cooling tubes configured to direct coolant from the coolant source through the first condenser, from the first condenser through the second condenser, and from the second condenser back to the coolant source.

DETAILED DESCRIPTION OF THE INVENTION

The following detailed description illustrates a steam turbine power system and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a combined-cycle power system. However, it is contemplated that this disclosure has general application to steam turbines in a broad range of systems and in a variety of applications other than combined-cycle power systems.

Figure 1:
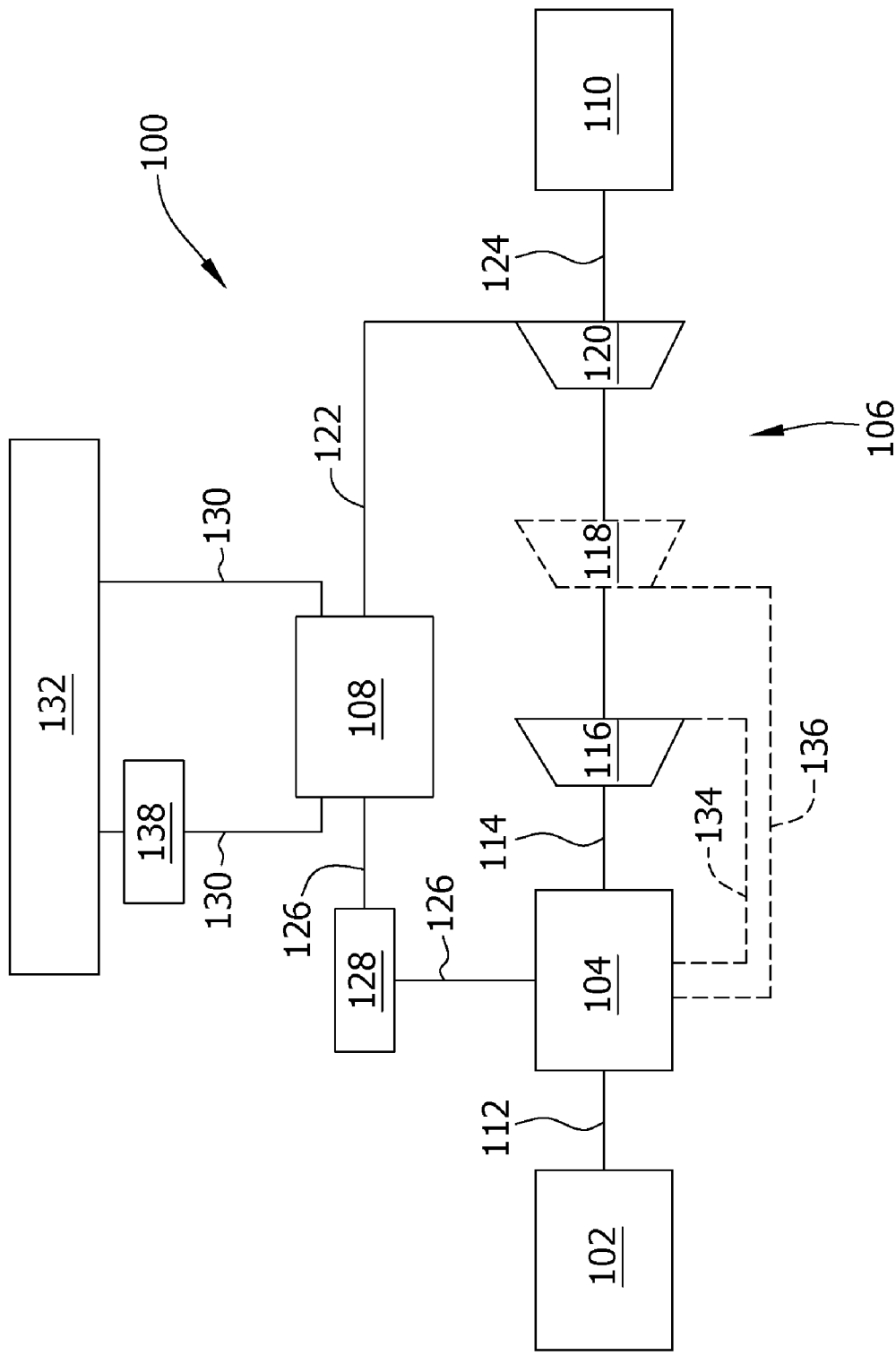
FIG. 1 is a flow diagram of a steam turbine train.

FIG. 1 illustrates an exemplary steam turbine train 100. In the exemplary embodiment, train 100 includes a heat source assembly 102, a heat recovery steam generator (HRSG) assembly 104, a steam turbine assembly 106, a condenser assembly 108, and a prime mover assembly 110 (e.g., at least one electrical generator, pump, propeller, etc.). Heat source assembly 102 may include any suitable heat source(s), such as, but not limited to, a nuclear heat source, a coal-fired heat source, a gas turbine heat source, and/or any other heat source that enables train 100 to function as described herein. In the exemplary embodiment, HRSG assembly 104 may include a multi-pressure HRSG with a reservoir for containing a working fluid (e.g., liquid water). In other embodiments, HRSG assembly 104 may include any suitable number of HRSG of any suitable type that enable train 100 to function as described herein. In the exemplary embodiment, HRSG assembly 104 is coupled to heat source assembly 102 via at least one heat transfer line 112 that facilitates channeling heat from heat source assembly 102 to HRSG assembly 104. HRSG assembly 104 is also coupled in flow communication with steam turbine assembly 106 via at least one steam conduit 114 that facilitates channeling steam from HRSG assembly 104 to steam turbine assembly 106.

In the exemplary embodiment, steam turbine assembly 106 includes a high pressure (HP) turbine assembly 116, an intermediate pressure (IP) turbine assembly 118, and a low pressure (LP) turbine assembly 120 in serial flow arrangement. In some embodiments, LP turbine assembly 120 may suitably be divided into any number of LP turbine sections (e.g., a dual-flow LP turbine section). Optionally, steam turbine assembly 106 may not include IP turbine assembly 118 such that HP turbine assembly 116 and LP turbine assembly 120 are coupled in direct flow communication with one another. In the exemplary embodiment, LP turbine assembly 120 is coupled in flow communication with condenser assembly 108 via at least one exhaust conduit 122, and steam turbine assembly 106 is operatively coupled to prime mover assembly 110 via at least one drive shaft 124. Condenser assembly 108 is coupled in flow communication with HRSG assembly 104 via at least one condensate transfer line 126 to facilitate pumping condensate from condenser assembly 108 to HRSG assembly 104 via any suitable pump 128. In the exemplary embodiment, condenser assembly 108 includes a liquid-to-air heat exchanger with any suitable number of cooling tubes 130 extending therethrough, each cooling tube 130 channeling any suitable coolant (e.g., a liquid, a gas, etc.) through condenser assembly 108 from a coolant source 132 (e.g., a lake, a cooling tower, etc.) via a pump 138, as described in detail below.

In operation, heat source assembly 102 generates heat that is directed to HRSG assembly 104 via heat transfer line 112, thereby heating the working fluid (e.g., the liquid water) within HRSG assembly 104 to produce steam therein. The steam is directed from HRSG assembly 104 into steam turbine assembly 106 via steam conduit 114 such that the steam is channeled sequentially through HP turbine assembly 116, IP turbine assembly 118, and LP turbine assembly 120 to facilitate driving HP turbine assembly 116, IP turbine assembly 118, and LP turbine assembly 120, respectively, and actuating prime mover assembly 110 via drive shaft 124 to generate electricity. In some embodiments, the steam exiting HP turbine assembly 116 may be directed from HP turbine assembly 116 back into HRSG assembly 104 via a first reheat conduit 134 to be reheated within HRSG assembly 104 and then may be directed from HRSG assembly 104 into IP turbine assembly 118 via a second reheat conduit 136 such that an operational efficiency of steam turbine assembly 106 is facilitated to be improved (i.e., steam turbine assembly 106 may have at least one "reheat cycle"). After the steam flows through LP turbine assembly 120, the steam is exhausted into condenser assembly 108 via exhaust conduit 122, wherein heat is transferred from the steam to the coolant flowing through cooling tubes 130, thereby condensing the steam within condenser assembly 108 to produce a condensate (e.g., liquid water) within condenser assembly 108. The condensate is then pumped back to HRSG assembly 104 across condensate transfer line 126 via pump 128 to be reheated within HRSG assembly 104 and re-circulated through train 100.

Figure 2:
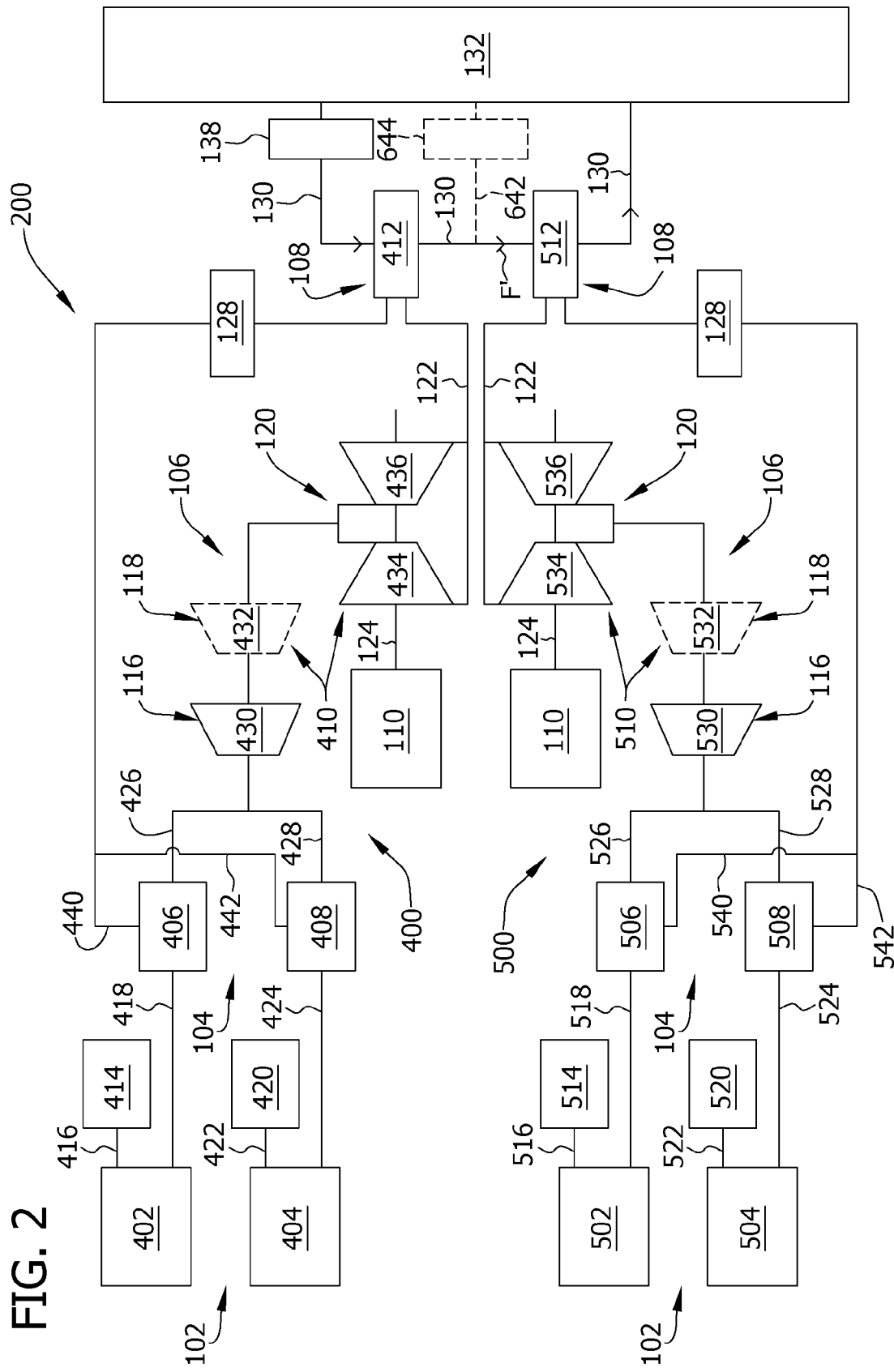
FIG. 2 is a flow diagram of a power system utilizing the steam turbine train shown in FIG. 1.

FIG. 2 illustrates one embodiment of a power system 200 that includes a first steam turbine train 400 and a second steam turbine train 500 that are substantially similar to train 100 shown in FIG. 1 and similar components are indicated using the same reference numerals used in FIG. 1. In other embodiments, power system 200 may include any suitable number of steam turbine trains (e.g., three trains, four trains, five trains, etc.) that enables power system 200 to function as described herein.

In the exemplary embodiment of first train 400, heat source assembly 102 includes a first gas turbine 402 and a second gas turbine 404 (i.e., first train 400 is arranged in a combined-cycle configuration), and HRSG assembly 104 includes a first HRSG 406 and a second HRSG 408. In other embodiments, first train 400 may include any suitable number of HRSG that are heated by any suitable number of gas turbines and/or any other suitable heat source. In the exemplary embodiment, first gas turbine 402 is operatively coupled to a first electrical generator 414 via a first drive shaft 416 and coupled in flow communication with first HRSG 406 via a first heat transfer line 418. Second gas turbine 404 is operatively coupled to a second electrical generator 420 via a second drive shaft 422 and coupled in flow communication with second HRSG 408 via a second heat transfer line 424. In some embodiments of first train 400, either first gas turbine 402 and/or second gas turbine 404 may, together with steam turbine assembly 106, be operatively coupled to prime mover assembly 110 such that first gas turbine 402, second gas turbine 404, and/or steam turbine assembly 106 facilitate cooperatively driving prime mover assembly 110 (e.g., first train 400 may be in a "single shaft combined-cycle" arrangement). Alternatively, first gas turbine 402 and/or second gas turbine 404 may be operatively coupled to any suitable device (e.g., a mechanical drive device such as, for example, a pump, a propeller, a compressor, etc.) via first drive shaft 416 and/or second drive shaft 422, respectively.

In the exemplary embodiment, steam turbine assembly 106 of first train 400 includes a first steam turbine 410, and condenser assembly 108 of first train 400 includes a first condenser 412. HP turbine assembly 116 of first steam turbine 410 includes a first HP turbine section 430, and IP turbine assembly 118 of first steam turbine 410 includes a first IP turbine section 432. LP turbine assembly 120 of first steam turbine 410 includes a first LP turbine section 434 and a second LP turbine section 436. In other embodiments, LP turbine assembly 120 of first steam turbine 410 may have any suitable number of LP turbine sections. In the exemplary embodiment, first HRSG 406 and second HRSG 408 are coupled in flow communication with first steam turbine 410 via a first steam conduit 426 and a second steam conduit 428, respectively, and first condenser 412 is coupled in flow communication with first HRSG 406 and second HRSG 408 via a first condensate transfer line 440 and a second condensate transfer line 442, respectively.

In the exemplary embodiment of second train 500, heat source assembly 102 includes a third gas turbine 502 and a fourth gas turbine 504 (i.e., second train 500 is arranged in a combined-cycle configuration), and HRSG assembly 104 includes a third HRSG 506 and a fourth HRSG 508. In other embodiments, second train 500 may include any suitable number of HRSG that are heated by any suitable number of gas turbines and/or any other suitable heat source. In the exemplary embodiment, third gas turbine 502 is operatively coupled to a third electrical generator 514 via a third drive shaft 516 and coupled in flow communication with third HRSG 506 via a third heat transfer line 518. Fourth gas turbine 504 is operatively coupled to a fourth electrical generator 520 via a fourth drive shaft 522 and coupled in flow communication with fourth HRSG 508 via a fourth heat transfer line 524. In some embodiments of second train 500, either third gas turbine 502 and/or fourth gas turbine 504 may, together with steam turbine assembly 106, be operatively coupled to prime mover assembly 110 such that third gas turbine 502, fourth gas turbine 504, and/or steam turbine assembly 106 facilitate cooperatively driving prime mover assembly 110 (e.g., second train 500 may be in a "single shaft combined-cycle" arrangement). Alternatively, third gas turbine 502 and/or fourth gas turbine 504 may be operatively coupled to any suitable device (e.g., a mechanical drive device such as, for example, a pump, a propeller, a compressor, etc.) via third drive shaft 516 and/or fourth drive shaft 522, respectively.

In the exemplary embodiment, steam turbine assembly 106 of second train 500 includes a second steam turbine 510, and condenser assembly 108 of second train 500 includes a second condenser 512. HP turbine assembly 116 of second steam turbine 510 includes a second HP turbine section 530, and IP turbine assembly 118 of second steam turbine 510 includes a second IP turbine section 532. LP turbine assembly 120 of second steam turbine 510 includes a third LP turbine section 534 and a fourth LP turbine section 536. In other embodiments, LP turbine assembly 120 of second steam turbine 510 may have any suitable number of LP turbine sections. In the exemplary embodiment, third HRSG 506 and fourth HRSG 508 are coupled in flow communication with second steam turbine 510 via a third steam conduit 526 and a fourth steam conduit 528, respectively, and second condenser 512 is coupled in flow communication with third HRSG 506 and fourth HRSG 508 via a third condensate transfer line 540 and a fourth condensate transfer line 542, respectively. In the exemplary embodiment, cooling tubes 130 extend from coolant source 132 through condenser 412, from condenser 412 through condenser 512, and from condenser 512 back to coolant source 132 to facilitate delivering coolant from coolant source 132 through condenser 412 and condenser 512 in series via pump 138.

When power system 200 is operational, first gas turbine 402, second gas turbine 404, third gas turbine 502, and fourth gas turbine 504 simultaneously operate first electrical generator 414, second electrical generator 420, third electrical generator 514, and fourth electrical generator 520, respectively, via first drive shaft 416, second drive shaft 422, third drive shaft 516, and fourth drive shaft 522, respectively. First gas turbine 402 discharges hot gases into first HRSG 406 via first heat transfer line 418, and second gas turbine 404 discharges hot gases into second HRSG 408 via second heat transfer line 424. Third gas turbine 502 discharges hot gases into third HRSG 506 via third heat transfer line 518, and fourth gas turbine 504 discharges hot gases into fourth HRSG 508 via fourth heat transfer line 524. As such, first HRSG 406, second HRSG 408, third HRSG 506, and fourth HRSG 508 simultaneously heat the working fluid (e.g., liquid water) housed therein to generate steam.

First HRSG 406 and second HRSG 408 generate steam that is channeled into first steam turbine 410 via first steam conduit 426 and second steam conduit 428, respectively. Specifically, the steam generated within first HRSG 406 and second HRSG 408 is channeled through first HP turbine section 430 and first IP turbine section 432 and is subsequently split into a first portion of steam that is channeled through first LP turbine section 434 and a second portion of steam that is channeled through second LP turbine section 436, thereby operating prime mover assembly 110 of train 400 via drive shaft 124 to produce electricity. In other embodiments, first train 400 may have at least one reheat cycle, as shown in FIG. 1 and described above. In the exemplary embodiment, the first and second portions of steam are then exhausted from first LP turbine section 434 and second LP turbine section 436, respectively, into first condenser 412 via exhaust conduit 122 of train 400. Within first condenser 412, heat is transferred from the steam to the coolant flowing through cooling tubes 130 such that the steam condenses to produce a condensate (e.g., liquid water). The condensate is pumped back to first HRSG 406 and second HRSG 408 through first condensate transfer line 440 and second condensate transfer line 442, respectively, via pump 128 of first train 400 to be re-circulated through first train 400.

Third HRSG 506 and fourth HRSG 508 generate steam that is channeled into second steam turbine 510 via third steam conduit 526 and fourth steam conduit 528, respectively. Specifically, the steam generated within third HRSG 506 and fourth HRSG 508 is channeled through second HP turbine section 530 and second IP turbine section 532 and is subsequently split into a first portion of steam that is channeled through third LP turbine section 534 and a second portion of steam that is channeled through fourth LP turbine section 536, thereby operating prime mover assembly 110 of train 500 via drive shaft 124 to produce electricity. In other embodiments, second train 500 may have at least one reheat cycle, as shown in FIG. 1 and described above. In the exemplary embodiment, the first and second portions of steam are then exhausted from third LP turbine section 534 and fourth LP turbine section 536, respectively, into second condenser 512 via exhaust conduit 122 of train 500. Within second condenser 512, heat is transferred from the steam to the coolant flowing through cooling tubes 130 such that the steam condenses to produce a condensate (e.g., liquid water). The condensate is pumped back to third HRSG 506 and fourth HRSG 508 through third condensate transfer line 540 and fourth condensate transfer line 542, respectively, via pump 128 of second train 500 to be re-circulated through second train 500.

In the exemplary embodiment, the coolant is channeled through condensers 412, 512 from coolant source 132 via cooling tubes 130 in flow direction F'. Specifically, the coolant is channeled from coolant source 132 through first condenser 412, from first condenser 412 through second condenser 512, and from second condenser 512 back to coolant source 132, such that condensers 412, 512 receive the coolant from coolant source 132 in series with one another. In other embodiments, the coolant may be channeled through second condenser 512 before being channeled through first condenser 412 (i.e., in a direction opposite to flow direction F'). Alternatively, if power system 200 includes more than two trains and/or more than two condensers, the coolant may be channeled through the condensers of the trains in any suitable order.

With the coolant being channeled through first condenser 412 and second condenser 512 in series (i.e., flowing initially through first condenser 412 and subsequently through second condenser 512), it is possible to obtain a different pressure in each of condensers 412, 512. Specifically, it is possible to obtain a lower pressure in first condenser 412 (i.e., the condenser in which the coolant first flows) than in second condenser 512 (i.e. the condenser in which the coolant subsequently flows). In one embodiment, for example, it is possible to obtain a pressure in first condenser 412 of about 1.1 HgA and to obtain a pressure in second condenser 512 of about 1.3 HgA. In other embodiments, in which power system 200 includes a third train having a third condenser, it is possible to obtain a pressure in the third condenser of about 1.5 HgA when the coolant is channeled through first condenser 412, then through second condenser 512, and subsequently through the third condenser.

Moreover, when circulating the coolant through first condenser 412 before channeling the coolant through second condenser 512, the log mean temperature of the coolant is facilitated to be lowered in first condenser 412, thereby enabling first condenser 412 to be designed for the lower condenser pressure. As such, with a lower condenser pressure in first condenser 412, first steam turbine 410 is facilitated to be designed with a reduced back pressure, thereby yielding a greater output for the same performance level (e.g., heat supply level) and/or a raised net combined-cycle efficiency (e.g., of about 0.2 percent in some applications). Additionally, with a lower condenser pressure in first condenser 412, first steam turbine 410 is facilitated to be designed with a larger last stage bucket (LSB) length. In some embodiments, to account for the decreased pressure within first condenser 412, pump 128 of first train 400 may be designed with a larger discharge pressure, and/or first condenser 412 may be designed with a larger surface area to account for the reduction in log mean temperature difference (LMTD) between condensers 412, 512.

In one embodiment, a bypass tube 642 may be coupled to cooling tubes 130 between first condenser 412 and second condenser 512 to facilitate either diverting a portion of the coolant flowing between first condenser 412 and second condenser 512 to coolant source 132 (e.g., by opening a valve positioned along bypass tube 642) and/or supplementing the coolant flowing between first condenser 412 and second condenser 512 with additional coolant from coolant source 132 (e.g., by operating a pump 644 positioned along bypass tube 642) such that a difference in LSB annulus velocity and/or LSB exhaust loss between first train 400 and second train 500 may be achieved, thereby enabling an operator to minimize an average LSB exhaust loss across power system 200 and improve an average operating efficiency of power system 200 during any given operational load of power system 200 (i.e., at base load, at part load, etc.).

The methods and systems described herein facilitate obtaining a lower condenser pressure in a steam turbine train. Specifically, the methods and systems described herein facilitate obtaining a lower back pressure in at least one of multiple, independent condensing steam turbine trains by lowering the condenser pressure in at least one of the steam turbine trains. As such, the methods and systems described herein facilitate enhancing the output and efficiency capabilities of larger power systems.

Exemplary embodiments of a steam turbine power system and a method of assembling the same are described above in detail. The methods and systems described herein are not limited to the specific embodiments described herein, but rather, components of the methods and systems may be utilized independently and separately from other components described herein. For example, the methods and systems described herein may have other applications not limited to practice with combined-cycle power systems, as described herein. Rather, the methods and systems described herein can be implemented and utilized in connection with various other power systems.

While the invention has been described in terms of various specific embodiments, those skilled in the art will recognize that the invention can be practiced with modification within the spirit and scope of the claims.

What is claimed is:

1. A method of assembling a steam turbine power system with a coolant source, said method comprising:
    providing a first steam turbine train including a first high pressure turbine assembly, a first low pressure turbine assembly coupled in flow communication with the first high pressure turbine assembly, and a first condenser coupled in flow communication with the first low pressure turbine assembly;
    providing a second steam turbine train including a second high pressure turbine assembly, a second low pressure turbine assembly coupled in flow communication with the second high pressure turbine assembly, and a second condenser coupled in flow communication with the second low pressure turbine assembly; and
    coupling cooling tubes to the first condenser and the second condenser, the cooling tubes configured to deliver coolant from the coolant source through the first condenser, from the first condenser through the second condenser, and from the second condenser back to the coolant source.

2. A method in accordance with claim 1, further comprising coupling a bypass tube to the cooling tubes between the first condenser and the second condenser such that the bypass tube is configured to divert a portion of the coolant flowing between the first condenser and the second condenser to the coolant source.

3. A method in accordance with claim 1, further comprising coupling a bypass tube to the cooling tubes between the first condenser and the second condenser such that the bypass tube is configured to supplement the coolant flowing between the first condenser and the second condenser with additional coolant from the coolant source.

4. A method in accordance with claim 1, wherein providing a first steam turbine train comprises providing the first steam turbine train with a first prime mover assembly operatively coupled to at least one of the first high pressure turbine assembly and the first low pressure turbine assembly.

5. A method in accordance with claim 1, wherein providing a first steam turbine train with a first low pressure turbine assembly comprises providing the first steam turbine train with the first low pressure turbine assembly including a first low pressure turbine section and a second low pressure turbine section, wherein the first low pressure turbine section and the second low pressure turbine section are coupled in flow communication with the first condenser.

6. A method in accordance with claim 4, further comprising:
    providing the first steam turbine train with a first heat recovery steam generator assembly;
    providing the first steam turbine train with a first heat source assembly;
    coupling the first heat recovery steam generator assembly in flow communication with the first high pressure turbine assembly and the first low pressure turbine assembly; and
    coupling the first heat source assembly in flow communication with the first heat recovery steam generator assembly.

7. A method in accordance with claim 4, wherein providing a second steam turbine train comprises providing the second steam turbine train with a second prime mover assembly operatively coupled to at least one of the second high pressure turbine assembly and the second low pressure turbine assembly.

8. A method in accordance with claim 6, wherein providing the first steam turbine train with a first heat source assembly comprises providing the first steam turbine train with a first gas turbine, and wherein coupling the first heat source assembly in flow communication with the first heat recovery steam generator assembly comprises coupling the first gas turbine in flow communication with the first heat recovery steam generator assembly to facilitate directing exhaust from the first gas turbine to the first heat recovery steam generator assembly.

9. A method in accordance with claim 8, further comprising:
    providing at least one of an electrical generator and a mechanical drive device; and
    operatively coupling at least one of the electrical generator and the mechanical drive device to the first gas turbine.

10. A method in accordance with claim 8, further comprising operatively coupling the first gas turbine to the first prime mover assembly.

11. A steam turbine power system for use with a coolant source, said power system comprising:
    a first steam turbine train comprising a first high pressure turbine assembly, a first low pressure turbine assembly coupled in flow communication with said first high pressure turbine assembly, and a first condenser coupled in flow communication with said first low pressure turbine assembly;
    a second steam turbine train comprising a second high pressure turbine assembly, a second low pressure turbine assembly coupled in flow communication with said second high pressure turbine assembly, and a second condenser coupled in flow communication with said second low pressure turbine assembly; and
    cooling tubes coupled to said first condenser and said second condenser, said cooling tubes configured to direct coolant from the coolant source through said first condenser, from said first condenser through said second condenser, and from said second condenser back to the coolant source.

12. A system in accordance with claim 11, further comprising a bypass tube coupled to said cooling tubes between said first condenser and said second condenser such that said bypass tube is configured to divert a portion of the coolant flowing between said first condenser and said second condenser to the coolant source.

13. A system in accordance with claim 11, further comprising a bypass tube coupled to said cooling tubes between said first condenser and said second condenser such that said bypass tube is configured to supplement the coolant flowing between said first condenser and said second condenser with additional coolant from the coolant source.

14. A system in accordance with claim 11, wherein said first steam turbine train comprises a first prime mover assembly operatively coupled to at least one of said first high pressure turbine assembly and said first low pressure turbine assembly.

15. A system in accordance with claim 11, wherein said first low pressure turbine assembly comprises a first low pressure turbine section and a second low pressure turbine section, said first low pressure turbine section and said second low pressure turbine section coupled in flow communication with said first condenser.

16. A system in accordance with claim 14, wherein said first steam turbine train comprises a first heat recovery steam generator assembly and a first heat source assembly, said first heat recovery steam generator assembly coupled in flow communication with said first high pressure turbine assembly and said first low pressure turbine assembly, said first heat source assembly coupled in flow communication with said first heat recovery steam generator assembly.

17. A system in accordance with claim 14, wherein said second steam turbine train comprises a second prime mover assembly operatively coupled to at least one of said second high pressure turbine assembly and said second low pressure turbine assembly.

18. A system in accordance with claim 16, wherein said first heat source assembly comprises a first gas turbine, said first gas turbine coupled in flow communication with said first heat recovery steam generator assembly to facilitate directing exhaust from said first gas turbine to said first heat recovery steam generator assembly.

19. A system in accordance with claim 18, further comprising at least one of an electrical generator and a mechanical drive device operatively coupled to said first gas turbine.

20. A system in accordance with claim 18, wherein said first gas turbine is operatively coupled to said first prime mover assembly.

\* \* \* \* \*